United States Patent
Baehrle-Miller et al.

(10) Patent No.: US 10,576,956 B2
(45) Date of Patent: Mar. 3, 2020

(54) DRIVER ASSISTANCE SYSTEM WITH INCREASED RELIABILITY AND AVAILABILITY

(71) Applicant: Robert Bosch GmbH, Stuttgart (DE)

(72) Inventors: Frank Baehrle-Miller, Schoenaich (DE); Dieter Blattert, Kirchheim/Neckar (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 15/021,099

(22) PCT Filed: Sep. 9, 2014

(86) PCT No.: PCT/EP2014/069165
§ 371 (c)(1),
(2) Date: Mar. 10, 2016

(87) PCT Pub. No.: WO2015/036393
PCT Pub. Date: Mar. 19, 2015

(65) Prior Publication Data
US 2016/0214595 A1    Jul. 28, 2016

(30) Foreign Application Priority Data
Sep. 13, 2013    (DE) .................. 10 2013 218 401

(51) Int. Cl.
*B60T 17/22* (2006.01)
*B60T 7/22* (2006.01)
(Continued)

(52) U.S. Cl.
CPC .............. *B60T 17/221* (2013.01); *B60T 7/22* (2013.01); *B60T 8/885* (2013.01); *G05D 1/0088* (2013.01);
(Continued)

(58) Field of Classification Search
CPC .... B60T 17/221; B60T 7/22; B60T 2201/022; B60T 2270/402; G05D 1/0088
See application file for complete search history.

(56) References Cited

U.S. PATENT DOCUMENTS

| | | | |
|---|---|---|---|
| 8,397,879 B2 | 3/2013 | Maron et al. | |
| 2005/0264099 A1 | 12/2005 | Kamiya et al. | |

(Continued)

FOREIGN PATENT DOCUMENTS

| | | | |
|---|---|---|---|
| CN | 101495351 A | 7/2009 | |
| CN | 101835664 A | 9/2010 | |

(Continued)

OTHER PUBLICATIONS

International Search Report corresponding to PCT Application No. PCT/EP2014/069165, dated Nov. 28, 2014 (German and English language document) (5 pages).

Primary Examiner — Aaron L Troost
(74) Attorney, Agent, or Firm — Maginot, Moore & Beck LLP

(57) ABSTRACT

A method for operating a motor vehicle includes detecting an operative state of the motor vehicle. The method further includes shifting the parking brake unit of the parking brake from a rest state into a predetermined operative state in response to the detected operative state of the motor vehicle. The motor vehicle includes a service brake and a parking brake. The service brake of the motor vehicle is activated by a pressure generator. The parking brake of the motor vehicle is activated by a parking brake unit. The motor vehicle has an autonomous operating mode and/or a partially autonomous operating mode that can be activated. The parking brake is configured to, in the predetermined operative state, produce a no braking effect and/or a lower braking effect compared to a full activation of the parking brake.

11 Claims, 5 Drawing Sheets

(51) Int. Cl.
  *B60T 8/88*     (2006.01)
  *G05D 1/00*     (2006.01)
(52) U.S. Cl.
  CPC ... *B60T 2201/022* (2013.01); *B60T 2270/402* (2013.01)

(56) References Cited

U.S. PATENT DOCUMENTS

| | | | |
|---|---|---|---|
| 2007/0068746 A1* | 3/2007 | Chittka | F16D 65/18 188/72.6 |
| 2010/0217488 A1* | 8/2010 | Nijakowski | B60T 17/221 701/48 |
| 2010/0308645 A1* | 12/2010 | Maron | B60T 13/588 303/20 |
| 2013/0253793 A1* | 9/2013 | Lee | B60W 50/029 701/70 |
| 2014/0142827 A1* | 5/2014 | Shimizu | B60T 7/22 701/70 |
| 2014/0345986 A1* | 11/2014 | Foitzik | B60T 7/12 188/106 P |

FOREIGN PATENT DOCUMENTS

| | | |
|---|---|---|
| DE | 102 18 825 A1 | 11/2003 |
| DE | 10 2004 046 869 A1 | 4/2006 |
| DE | 10 2006 048 910 A1 | 4/2008 |
| DE | 10 2009 037 382 A1 | 2/2011 |
| DE | 10 2010 001 492 A1 | 8/2011 |
| DE | 10 2011 110 892 A1 | 2/2013 |
| EP | 1985884 A1 | 10/2008 |
| FR | 2 875 875 A1 | 3/2006 |
| JP | 2000-326844 A | 11/2000 |
| JP | 2009-539676 A | 11/2009 |
| JP | 2010-500511 A | 1/2010 |
| WO | 2006/010735 A1 | 2/2006 |

* cited by examiner

DRIVER ASSISTANCE SYSTEM WITH INCREASED RELIABILITY AND AVAILABILITY

This application is a 35 U.S.C. § 371 National Stage Application of PCT/EP2014/069165, filed on Sep. 9, 2014, which claims the benefit of priority to Ser. No. DE 10 2013 218 401.8, filed on Sep. 13, 2013 in Germany, the disclosures of which are incorporated herein by reference in their entirety.

BACKGROUND

Increasingly, functions in motor vehicles are provided as (partially) autonomous driving maneuvers. These currently include in particular the "autonomous parking" and "adaptive cruise control" functions. With the "autonomous parking" function for example, the driver of a vehicle is assisted when maneuvering, in particular during a parking process. During this the surroundings of the vehicle are sensed by means of sensors and the vehicle is automatically braked if it approaches another object too closely, such as for example a parked vehicle. The "adaptive cruise control" function, which enables automatic approaching and braking because of decelerated or stationary vehicles ahead, also operates similarly.

Known driver assistance systems usually comprise a controller with an algorithm, ultrasonic sensors for sensing the surroundings of the vehicle and an actuator of the brake system, such as for example a hydraulic unit. Once the vehicle has fallen below a minimum distance, the actuator is activated by the controller and the vehicle is automatically braked. If the hydraulic brake system now fails during a process—for example because of a fault of the brake actuator or brake controller—the vehicle is no longer automatically braked, so that a collision with another object can occur.

DE102006048910 is known from the prior art for example. Said document discloses a method for protecting a parking assistance system against a failure of the service brake system. In order to avoid a collision of the vehicle with a nearby object, it is proposed to monitor the function of the service brake system and in the event of a fault to operate at least one other vehicle system, such as for example an automatic gearbox or an automatic parking brake, in order to brake the vehicle and/or to interrupt the transfer of the drive torque to the wheels.

Furthermore, DE102010001492 discloses a method for activating at least one electronically activated parking brake device in a vehicle, wherein the parking brake device is used for support depending on engine and/or gearbox parameters in predetermined operative states of the vehicle. A further application area of the procedure is the preparation of a braking process for the vehicle. In particular, with multi-disk brakes, at the start of the braking process when operating the brake pedal only the air gap between the disks is closed. A braking effect does not occur yet here, so that the braking process is delayed. The electronic parking brake device can be activated to reduce or remove the air gap between the disks if a predetermined negative gradient is detected during the operative displacement of the gas pedal. If for example it is determined that the driver has finished the operation of the gas pedal quickly and changed to the brake pedal, the electronic parking brake device can be activated in order to enable faster braking of the vehicle for the driver as a result.

Systems are also known that assist the driver as a traction aid by means of automatic braking when starting off on a hill. For example, DE10218825 discloses a motor vehicle brake system in a preferred development with which activation of the parking function takes place automatically on inclines after reaching the stationary vehicle state from forward travel. In this way, unintended backward rolling of the vehicle is substantially prevented. In one advantageous configuration of the aforementioned embodiment, the activation of the parking function only takes place if the service brake is released. This is based on the consideration that backward rolling of the vehicle cannot occur if the service brake is being operated, so that owing to said configuration unnecessary activation of the parking function is avoided.

If the service brake system fails during an autonomous or partially autonomous function—for example because of a fault of the brake actuator or brake controller—the vehicle will no longer be automatically braked, so that a collision with another object can occur.

SUMMARY

It is therefore the object of the present disclosure to increase the availability and the reliability of autonomous or partially autonomous functions. This object is achieved by certain features indicated in the disclosure. Further embodiments having additional features are also the subject matter of the disclosure.

The method according to the disclosure for the operation of a motor vehicle, wherein at least one autonomous or partially autonomous operating mode of the motor vehicle can be activated and the motor vehicle comprises a service brake and a parking brake, is characterized in that in response to a detected operative state of the motor vehicle the parking brake is shifted from a rest state into a predetermined operative state, wherein the predetermined operative state of the parking brake is determined such that the parking brake produces no braking effect or a significantly lower braking effect compared to full activation.

This is understood to mean that said motor vehicle comprises at least one function for the autonomous or partially autonomous operation of the motor vehicle. If a defined operative state of the motor vehicle is detected, the parking brake is activated in response and in alignment thereto. In addition to the already known control of the steering angle, the pressure modulation (service brake) and the acceleration process (electronic gas pedal), the parking brake is also incorporated within the autonomous or partially autonomous operating mode.

During such an activation, the parking brake is shifted from a rest state into a predetermined operative state. The predetermined operative state of the parking brake is defined for example such that the parking brake still produces no braking effect, but only achieves a reduction of the free travel and/or of the air gap, or eliminates the free travel and/or the air gap. Free travel means the distance between the end position of the locking mechanism, i.e. of the braking unit, in the opened state, i.e. the rest state, and the brake piston when the brake is not being operated. The air gap means the sum of the distances of the brake linings from the brake disk. This means that freewheeling of the brake disk is minimized. Advantageously, with the elimination of the free travel and the air gap, only minimal distance changes thus result in the build-up of a braking pressure. Thus a suitable deceleration can be provided in a very short time. The response time of the brake is thus reduced. The reliability of the automated function is increased. Small braking torques may already occur in said position.

The predetermined operative state of the parking brake can alternatively be determined such that the parking brake produces a significantly lower braking effect compared to the full activation of the parking brake. The parking brake unit is activated in this case so that not only are the free travel and/or the air gap overcome, but a clamping force is also provided for the brake. The magnitude of the clamping force can be made dependent on the detected operative state of the motor vehicle. The parking brake thus carries out the driver's component, which therefore does not have to intervene in the system. The automated functions can thus be maintained for considerably longer.

It is advantageously provided here that the method is characterized in that the following is detected as an operative state of the motor vehicle,
- activation of the autonomous or partially autonomous operating mode and/or
- the standstill of the motor vehicle and/or
- the deceleration of the motor vehicle and/or
- the inclination of the motor vehicle and/or
- at least one fault and/or unavailability of the autonomous or partially autonomous operating mode and/or
- at least one result of a test, in particular a cyclic test, of components and operative states of the vehicle that are necessary for the autonomous or partially autonomous operating mode.

This is understood to mean that different and/or multiple factors can be considered in order to define an operative state of the motor vehicle. In response to the detected operative state of the motor vehicle, the parking brake is shifted from a rest state into a predetermined operative state. The operative state can be an activated autonomous or partially autonomous operating mode of the vehicle for this. Furthermore, further vehicle-related factors can be determined and taken into account, such as for example the standstill or deceleration of the motor vehicle. Advantageously, the inclination of the motor vehicle can also be considered. This can for example indicate whether and in which direction a motor vehicle is facing on an incline, and accordingly can specify a changed predetermination of the operative state of the parking brake and/or an altered method.

Furthermore, it has also proved to be advantageous to check the functionality of the autonomous or partially autonomous operating mode. The operative state of the motor vehicle can be described here based on determined or detected faults and/or on the unavailability of the autonomous or partially autonomous operating mode. Furthermore, the results of a test of components that are necessary for the autonomous or partially autonomous operating mode can be used advantageously for this purpose. Cyclical tests can be carried out for this purpose during the performance of the partially autonomous or autonomous driving function.

The electrical components of the brake system can be checked during this, including the associated end stages, for example also outside of an active braking intervention. These include, for example, electrical tests of the valves for open lines, electrical tests of the valves for short-circuited lines and electrical tests of the pump motor. If a fault occurs during this, or if individual values are outside of a specification, then the predetermined operative state of the parking brake can be set as a precautionary measure.

The braking pressure or other components of the brake system can also be advantageously checked in order to analyze the functionality. The reason for the inadequate provision of braking pressure can be defective pump elements or too much air in the brake circuit for example.

Besides the components of the brake system, other systems and the components thereof can be necessary for autonomous or partially autonomous operation. These can include electrical steering and engine control for example. The functionality thereof can also characterize an operative state of the motor vehicle and is therefore to be checked accordingly, or the results of such tests are to be analyzed.

Advantageously, it is further provided that the method is characterized in that the predetermined operative state of the parking brake is a state of the parking brake in which
- an air gap and/or a free travel of the parking brake is minimized compared to the rest state and/or
- a predetermined air gap and/or a free travel of the parking brake is set and/or
- the parking brake applies a predetermined braking effect, wherein in particular it is provided that
- a position of the parking brake is set, by means of which a partially and/or fully laden motor vehicle is held on an incline and/or a position of the parking brake is set, by means of which a partially and/or fully laden motor vehicle is braked.

This means that there is not one certain predetermined operative state of the parking brake, but different predetermined operative states can be set. The predetermination of the operative states of the parking brake is carried out as already mentioned in response to a detected operative state of the motor vehicle. The parking brake can comprise a minimized and a defined air gap and/or free travel here. Advantageously, the reliability of the automated function can be increased owing to this. Alternatively, the parking brake can apply a predetermined braking effect, for example in order to hold a motor vehicle on an incline. If it is detected that a predetermined operative state of the parking brake is not suitable for achieving a predetermined effect, a new predetermined operative state of the parking brake can be set in response to a new detected operative state of the motor vehicle for example.

According to one advantageous embodiment, it is provided that the method is characterized in that a determination of the predetermined operative state of the parking brake is carried out depending on there being wear of at least one of a service brake and/or a parking brake.

This means that further factors can be considered for the determination of the predetermined operative state of the parking brake. Besides the aforementioned external factors, internal factors are also important.

These include for example the wear in a brake component. In this case, the determination of the operative state of the parking brake is carried out according to the present wear. This means that existing wear is taken into account when determining the operative state of the parking brake. By taking existing wear into account, it can be ensured that the desired or necessary braking effect occurs in a certain way. This means that possible wear is taken into account when minimizing or adjusting an air gap and/or the free travel, for example by means of an adapted, i.e. extended, approach distance of the parking brake unit from a rest position into the predetermined operative state of the parking brake.

According to one advantageous configuration, it is provided that the method is characterized in that the parking brake is shifted from the rest state into the predetermined operative state, wherein the predetermined operative state of the parking brake is set by means of
- a travel characteristic, wherein starting from the rest state the parking brake is actuated over a defined path in the direction of the predetermined operative state of the parking brake and/or a current characteristic, wherein a parking brake that is actuated by means of an electric motor is activated up to a maximum current level and/or a defined increase of a current level of the electric motor and/or a force characteristic, wherein the parking brake is activated up to a defined maximum clamping force, which is in particular determined by means of a force estimator.

This means that setting the predetermined operative state of the parking brake can be carried out with a different approach. A combination of different approaches is also conceivable. In this context, setting means for example the precise position into which the parking brake unit is shifted in order to achieve the predetermined effect. Setting not only constitutes the determination of the position of the parking brake unit for example, but also describes approaching and in particular reaching said position. For example, three approaches by means of which the predetermined operative state of the parking brake can be set are listed.

These include setting by means of a defined travel of the parking brake or of the parking brake unit. This means that starting from the rest state the parking brake, or the parking brake unit, is deflected by a defined distance in the direction of the predetermined operative state, in particular in the direction of application of the parking brake. The deflection can for example be carried out by means of an electric motor with a spindle drive. Reduction gears can also be used for this.

A further advantageous option for setting the predetermined operative state of the parking brake is the use of a current characteristic. In this case the parking brake is moved in the application direction from a first position by means of an electric motor for example. The free travel and the air gap of the parking brake are overcome by this. The current drain of the electric motor is relatively constant during this. However, the current drain rises once the free travel and the air gap are overcome and a build-up of a braking force has occurred. The current level for the predetermined operative state of the parking brake is set by means of a current characteristic and said position is maintained. Said current level can be defined absolutely or relative to the current level for overcoming the free travel and the air gap. The force occurring, for example the clamping force of the brake, can be estimated by means of the current level in this case.

Alternatively, the operative state of the parking brake can also be set directly by means of a force characteristic. A force estimator is necessary for this, which is built into in the brake system for example.

In one development, it is advantageously provided that the method is characterized in that the predetermined operative state of the parking brake is determined such that in a first step the parking brake is shifted into a first position in the application direction and in a second step the parking brake is shifted into a second position in the release direction, wherein in particular it is provided that a larger braking effect is caused by the parking brake in the first position than in the second position.

A type of calibration of the parking brake is intended to be carried out in this way. In this context this means that the sizes of the current free travel and air gap and/or the setting of the parking brake, i.e. for example the position of the parking brake unit in which a certain braking effect occurs, are initially to be determined. Starting from said first position of the parking brake, or of the parking brake unit, a second position of the parking brake, or of the parking brake unit, is set. Moreover, said second position is characterized in that a greater braking effect occurs in the first position. In this case the first position is characterized in particular by a small braking effect, for example for simply overcoming the free travel and the air gap, as well as a medium braking effect. The second position can also comprise a medium, if smaller braking effect, but in particular it is characterized by a small or no braking effect. For example, the parking brake can first be activated in the application direction until an increase of the force can be detected. Then the parking brake is moved further by a defined, in particular small, distance. As a result of said calibration, the free travel and the air gap are considerably reduced and the parking brake is effective considerably faster. The difference from normal setting by means of a distance or force characteristic is that a plurality of partly unknown parameters has to be considered during the setting, such as for example pressure, take-up distance, lining wear or caliper stiffness. Such parameters can be detected by the process of the calibration and can be considered therein. Depending on the strategy, the free travel and hence the start of the build-up of force can be reduced by a third to two thirds by this.

In one advantageous embodiment of the method according to the disclosure, it is provided that the operative state of the parking brake is determined such that the braking effect that is set by actuating the parking brake causes a motor vehicle to be held on an incline and/or a movement of the motor vehicle to be braked and/or movement of the motor vehicle against a desired drive direction to be prevented.

This is understood to mean that different effects could be achieved by the predetermined and set operative state of the parking brake. These include for example that a vehicle can be held, in particular on an incline. A further effect is for example that the movement of a motor vehicle is braked or a movement of the motor vehicle in a defined direction is prevented. For example, during a parking maneuver a movement of the motor vehicle in a certain direction can be enabled if said movement in said direction is necessary for the parking maneuver. A movement against said direction at this point in time can be prevented by means of the predetermined operative state of the parking brake. Of course, it is provided that the desired drive directions can also be varied within an autonomous or partially autonomous driving maneuver.

In a developed embodiment of the method according to the disclosure, it is provided that the operative state of the parking brake is dynamically adapted to a reaction of the motor vehicle to the predetermined operative state of the parking brake.

This is understood to mean that a predetermined operative state of the parking brake is set in a first step, in particular depending on a detected operative state of the motor vehicle. The operative state of the motor vehicle can however be further determined and analyzed. If the operative state of the motor vehicle changes, corresponding changes are made to the operative state of the parking brake. Furthermore, the reactions of the motor vehicle to the predetermined operative state of the parking brake are determined and analyzed. If for example a reaction of the motor vehicle does not proceed as defined or expected, the operative state of the parking brake can be dynamically adapted. If for example a deceleration of the motor vehicle does not take place at the expected level, the operative state of the parking brake can be adapted such that the braking effect occurs as a result of an increase.

According to a preferred development, a further operative state of the parking brake can be designed such that in the event of a malfunction of the service brake and/or of components of a service brake system and/or in the event of the unavailability of the service brake and/or of components of a service brake system, during the autonomous or partially autonomous operating mode the parking brake at least partly takes over a function of the service brake in order to at least partly carry out the activated autonomous or partially autonomous operating mode.

This means that in the event of a malfunction or failure or other unavailability of a provided component of the service brake system, the parking brake takes over the function of the service brake. A takeover can be partial. In particular, it is used to perform the activated autonomous or partially autonomous operating mode. Performance can also be partial. The parking brake can be used to finish the currently active function, for example an autonomous parking maneuver. Furthermore, the parking brake can enable the motor vehicle to be positionally fixed by means of full activation following the completion of the autonomous or partially autonomous operation. Alternatively, full activation of the parking brake and thereby positional fixing of the motor vehicle are also possible in the event of a fault.

The components of the service brake system can also include here peripheral components, such as valves, end stages and actuators, even if the same may not be activated by means of a current ESP system during a normal service brake process. Specific tests can be used for this. Regardless of this, activation can be provided in the future for the listed components, for example by-wire brake systems, by means of which checking can be facilitated.

The implementation of said development can be understood to mean that the predetermined operative state of the parking brake according to the disclosure corresponds to the further operative state of the parking brake described in the development. Alternatively, in the development it is also possible for example that the predetermined operative state of the parking brake according to the disclosure is set in a first step and the further operative state is set in a further step.

According to an advantageous embodiment, it is provided that in the event of a malfunction and/or unavailability of the service brake and/or of components of the service brake system, a drive torque of a vehicle engine is reduced in a first step and is adjusted again in a further step and/or a drive torque of a vehicle engine is adapted depending on the slope direction of the parking maneuver, wherein in particular the drive torque is partly reduced in the case of a positive slope (uphill) and/or the drive torque is completely reduced in the case of a negative slope (downhill).

The implementation of said development can be understood to mean that even in the event of a fault of the service brake an autonomous or partially autonomous operating mode of the vehicle shall be performed safely and/or terminated, also taking into account further factors, in particular in concert with the parking brake. The drive torque of the vehicle engine can be taken into account here for example. In this case the drive torque is reduced in a first step and then readjusted. The drive torque can also be adapted taking into account further factors. For example, the drive torque can be completely reduced in the case of an autonomous or partially autonomous driving maneuver in which the vehicle is moving downhill. Alternatively, the drive torque can be only partly reduced in the case of an autonomous or partially autonomous driving maneuver in which the vehicle is moving uphill. A part of the drive torque can thus continue to be used for the movement of the vehicle in the uphill direction.

According to a further advantageous embodiment, it is provided that the autonomous or partially autonomous operating mode of the motor vehicle is configured as a "parking aid" and/or "adaptive cruise control" and/or "autonomous evasive maneuver" and/or "autonomous emergency braking". Of course this will not exclude the implementation of further configurations of the driver assistance system.

The apparatus according to the disclosure for the operation of a motor vehicle, wherein at least one autonomous or partially autonomous operating mode of the motor vehicle can be activated and the motor vehicle comprises a service brake and a parking brake, is characterized in that means are provided, by means of which the parking brake is shifted into a predetermined operative state in response to a detected operative state of the motor vehicle, wherein the predetermined operative state of the parking brake is defined such that the parking brake produces a significantly lower braking effect compared to full activation.

In this context, means are to be understood to mean in particular components of a parking brake. There are different concepts of a parking brake, in which there can be different components and effects. One concept is for example the cable puller. Another concept is for example the motor-on-caliper, an electric motor disposed on the brake caliper with a suitable through-drive to the brake shoes. The effect can extend to an axle of the vehicle, for example the front axle and/or the rear axle, or can be implemented for individual wheels. Furthermore, an existing wheel brake can be accessed by means of said parking brake unit, or the braking effect can be implemented by means of a new wheel brake.

Said actuators of the parking brake system are for example activated in order to brake the vehicle. An autonomous brake intervention can be performed either by the controller of the service brake system—if the same is operating—or by any other controller. A dedicated controller for the parking brake is also possible. The function of said controller is preferably monitored by another controller that intervenes in the driving operation if the former has a fault. If the former fails, the other controller is preferably automatically active and intervenes in the driving operation. The controllers are connected to each other by means of a bus for example (for example a CAN bus). Thus a regulator and a controller, a bus system and a suitable algorithm can be considered to be further means.

According to a preferred development of the present disclosure, means are provided, by means of which the operative state of the parking brake is dynamically adapted to a reaction of the motor vehicle to the predetermined operative state of the parking brake.

As already described for the development of the method, the operative state of the parking brake can be dynamically adapted to further factors. One of said factors can be the vehicle itself. This can in particular be understood to mean a reaction of the vehicle to the predetermined operative state of the parking brake. This can for example be sliding by the vehicle, or a deviating deceleration. Further factors of the vehicle or of the surroundings can also be taken into account. Alternatively, adaptation to further factors can be carried out, for example to a varying slope. For example, existing sensors or sensors to be integrated can be used to determine said factors. Further means for analysis can for example be regulators and controllers, arithmetic units, algorithms, databases with stored values and communications systems.

Advantageously, means are provided, by means of which the predetermined operative state of the parking brake can be determined such that the parking brake is shifted into a first position in the application direction in a first step and the parking brake is shifted into a second position in the release direction in a second step, wherein in particular it is provided that a greater braking effect that is caused by the parking brake occurs in the first position than in the second position.

As already mentioned, the approach associated therewith can be considered to be a calibration. The means required for this largely relate to the aforementioned.

Furthermore, this is to be understood as means enabling the determination of the first and second positions. This can include for example displacement sensors, rotation angle sensors, force sensors and analysis options such as arithmetic units and control and regulating devices for controlling a current level.

In one advantageous development, further means are provided, by means of which the first and second positions are determined by analyzing a clamping force that is effected by a parking brake that is actuated by means of an electric motor, wherein in particular it is provided that the clamping force is determined on the basis of a current level of the electric motor. In particular, such means are understood to be devices for determining a current level and for controlling a current level with an electric motor.

BRIEF DESCRIPTION OF THE DRAWINGS

The disclosure is described in detail below using the exemplary embodiments represented in the figures, without thereby causing a limitation of the disclosure. In the figures.

DETAILED DESCRIPTION

Figure 1:
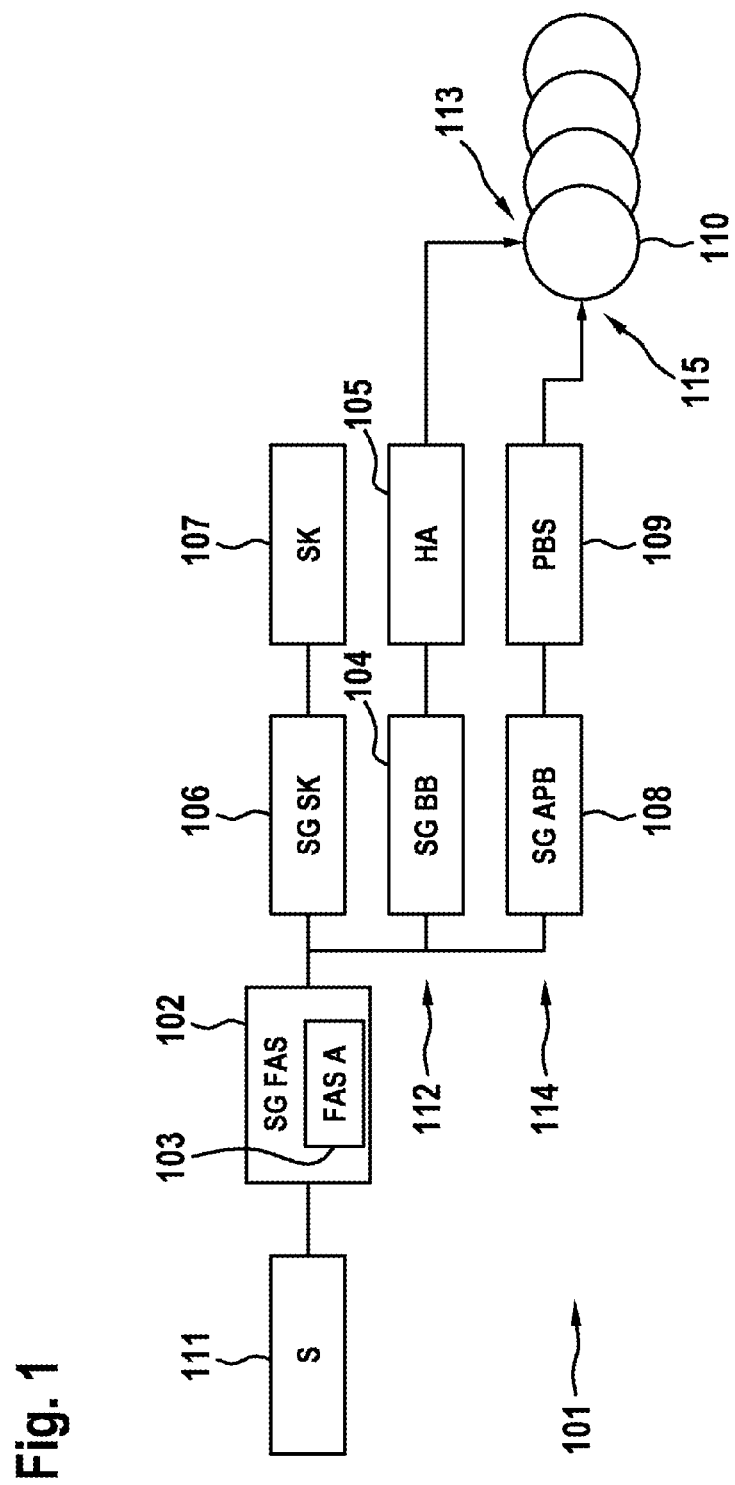
FIG. 1 shows a schematic block diagram of a driver assistance system with high levels of reliability and availability of the automated functions.

FIG. 1 shows a schematic block diagram of a driver assistance system, which is referred to as a whole by the reference character 101. The driver assistance system 101 essentially comprises a controller 102 for the driver assistance system 101 with a driver assistance system algorithm 103 and a service brake system 112 consisting of a pressure generator 105 (for example a hydraulic unit) with an associated controller 104 and for modulating the brake forces acting on the wheel brakes 110, as well as the wheel brakes 110.

Besides the service brake system 112, the driver assistance system 101 also comprises a parking brake system 114 (also referred to as an automatic parking brake or locking brake), consisting of a controller 108, a parking brake unit 109 and also wheel brakes 110.

Here wheel brakes 110 include all components that for example are involved in the generation of the clamping force after the hydraulic unit as the pressure generator 105 or an electric motor as a parking brake unit 109. For a more precise differentiation of the origin of the braking force, the wheel brake 110 is divided into the service brake 113 and the parking brake 115, wherein the service brake 113 is activated by the pressure generator 105 and the parking brake 115 by the parking brake unit 109.

Further components of the driver assistance system 101 are referred to as other components 107 (for example drive motor, steering, hydraulic brake system, automatic gearbox, etc.), which can also be equipped with associated controllers 106. Moreover, the driver assistance system comprises environment sensors 111, for example based on ultrasound. These are used to sense the surroundings. Acceleration and position sensors can also be used.

During a parking process for example, in which the driver assistance system 101 is active, the driver assistance system algorithm 103 monitors the surroundings of the vehicle regarding surrounding objects and autonomously intervenes in the driving operation by means of the service brake system 104, 105, 110 if the vehicle approaches another object too closely. The driver assistance algorithm 103 is provided in a dedicated driver assistance controller 102 here, but in principle can also be integrated within any other controller.

In order to avoid a collision in the event of a defective service brake system 112, the driver assistance system 101 is coupled to a second brake system, the parking brake system 114, by means of which the vehicle can be braked. The parking brake system 114 consists of a controller 108 with at least one parking brake unit 109 and wheel brakes 110. The significant increase in the availability and reliability of the automated function is however not achieved by the presence of a second independent actuator, for example the parking brake, but as a result of the parking brake being brought into a predetermined operative state in response to a detected operative state of the motor vehicle. The operation of the overall system is illustrated below using FIG. 2.

Figure 2:
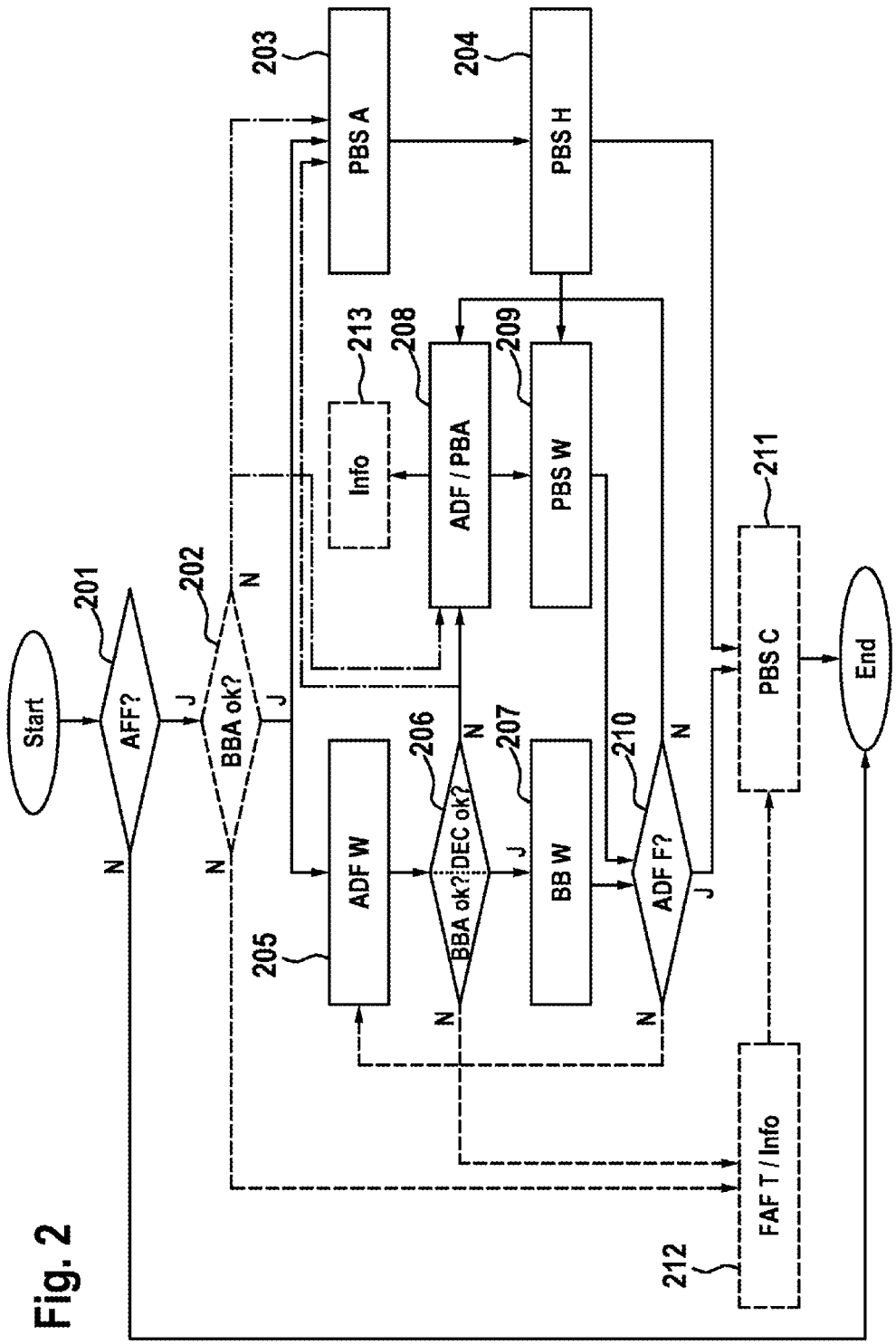
FIG. 2 shows a flow chart for illustrating the significant steps of a method for protecting a driver assistance system in the event of a fault in the service brake system with simultaneous high availability of the system by applying the parking brake unit.

FIG. 2 shows a flow chart for illustrating the significant steps of a method for protecting a driver assistance system with an existing or arising fault in the service brake system with simultaneous high availability of the system by the use of a second independent actuator using the example of an autonomous parking maneuver.

In this case it is first determined in a step 201 whether a driver assistance function is activated or is active. If so (J) a check can be made in a step 202 as to whether the service brake is in order. Some of the faults of a hydraulic unit can be detected in a timely manner by monitoring functions. These include line monitoring of the valves or of the motor for example.

Said monitoring generally results in functions that require hydraulic pressure to be provided being shut down. If the service brake is not in order (N), termination of the driver assistance function and notifying the driver can be carried out in a step 212.

Alternatively, in the event of the identification of a fault of the service brake system (N) in the preceding monitoring step 202, the driver assistance function can be performed in a further step 208 with the parking brake system. The parking brake takes care of the deceleration requirements in this case. The function is thus maintained and results in enhanced vehicle and function availability. For this purpose, in a parallel, preceding or subsequent step 203 the parking brake unit 109 can also be shifted into a position resulting in the reduction of the free travel and the air gap.

Step 202 can alternatively be omitted as a preceding step or only implemented during the performance of the driver assistance function in step 206. Therefore, it is shown in dashed form in FIG. 2. If step 202 is omitted or checking the service brake system has not indicated a fault (J), the driver assistance function is performed in a next step 205. For this purpose, all necessary actuators (for example, drive motor, steering, hydraulic service brake) are activated in order to carry out the "autonomous parking" function for example. In parallel therewith, in a step 203 the parking brake unit is shifted into a position resulting in the reduction of the free travel and the air gap. Said position is maintained in a further step 204. Step 203, 204 can also precede step 205.

When performing the driver assistance function, in a further step 206 during the performance a check is made as to whether the service brake system is in order. Alternatively or in addition, a check can be made as to whether the deceleration of the motor vehicle corresponds to an expected value. If this is the case (J), the necessary force modulation for performing the driver assistance function is carried out by means of the service brake in a step 207.

If it is provided that the parking brake is not directly shifted into the predetermined operative state when performing the driver assistance function, this can for example also be carried out on detecting a suitable deviation (N) in step 206. If for example it is determined by a monitoring function that a deceleration of the vehicle does not correspond to the expected value during the parking process, the parking brake can also be shifted into the predetermined operative state. For example, in this case there could be undetected damage to a hydraulic actuator. In this case the reason for the inadequate provision of braking pressure can be defective pump elements or too much air in the brake circuit for example.

If a fault (N) is detected in step 206 during the performance, i.e. if for example the service brake system is not in order or damage to the hydraulic actuator is detected, the parking brake takes care of the deceleration requirements. This means that the driver assistance function is performed with the parking brake system in a further step 208. As a result thereof, safety is maintained for people and the environment.

During performance of the driver assistance function with the parking brake, in a step 213 an item of information can be stored and/or provided to the driver. The driver may also be informed about a reduced power provision in step 213. During the performance of the driver assistance function with the parking brake system, in step 209 the necessary force modulation for the performance of the driver assistance function is carried out by means of the parking brake unit. The parking brake unit that has already been applied and held in position is used for this purpose. In this way, a rapid response of the necessary force modulation by means of the parking brake system can be enabled.

If a fault has been detected in step 206, i.e. if the service brake system is not in order (N), alternatively termination of the driver assistance function and notification to the driver can also be carried out in a step 212.

During the performance of the driver assistance function a check takes place in a further step 210 as to whether the driver assistance function has already been terminated. Termination of the driver assistance function can be carried out by deactivation by the driver and also by a completed performance of the function for example.

If there is no termination (N), the driver assistance function can continue to be performed. In the case in which the service brake was previously defective, step 208 can then immediately continue to be performed. Alternatively, in this case step 205 can be performed again and a new check can be made subsequently as to whether the service brake system is in order.

If in step 210 the driver assistance function is assessed as terminated (J), a normal build-up of force can be carried out in a subsequent step 211 by means of the parking brake unit that has already been applied and held in position. Step 211 is to be compared here with the activation of a parking brake of the vehicle in the parked state. This can be advantageous for some autonomous or partially autonomous functions, for example the "autonomous parking maneuver", but can be unnecessary or unsuitable for other autonomous or partially autonomous functions, for example "adaptive cruise control".

The process then terminates.

Figure 3:
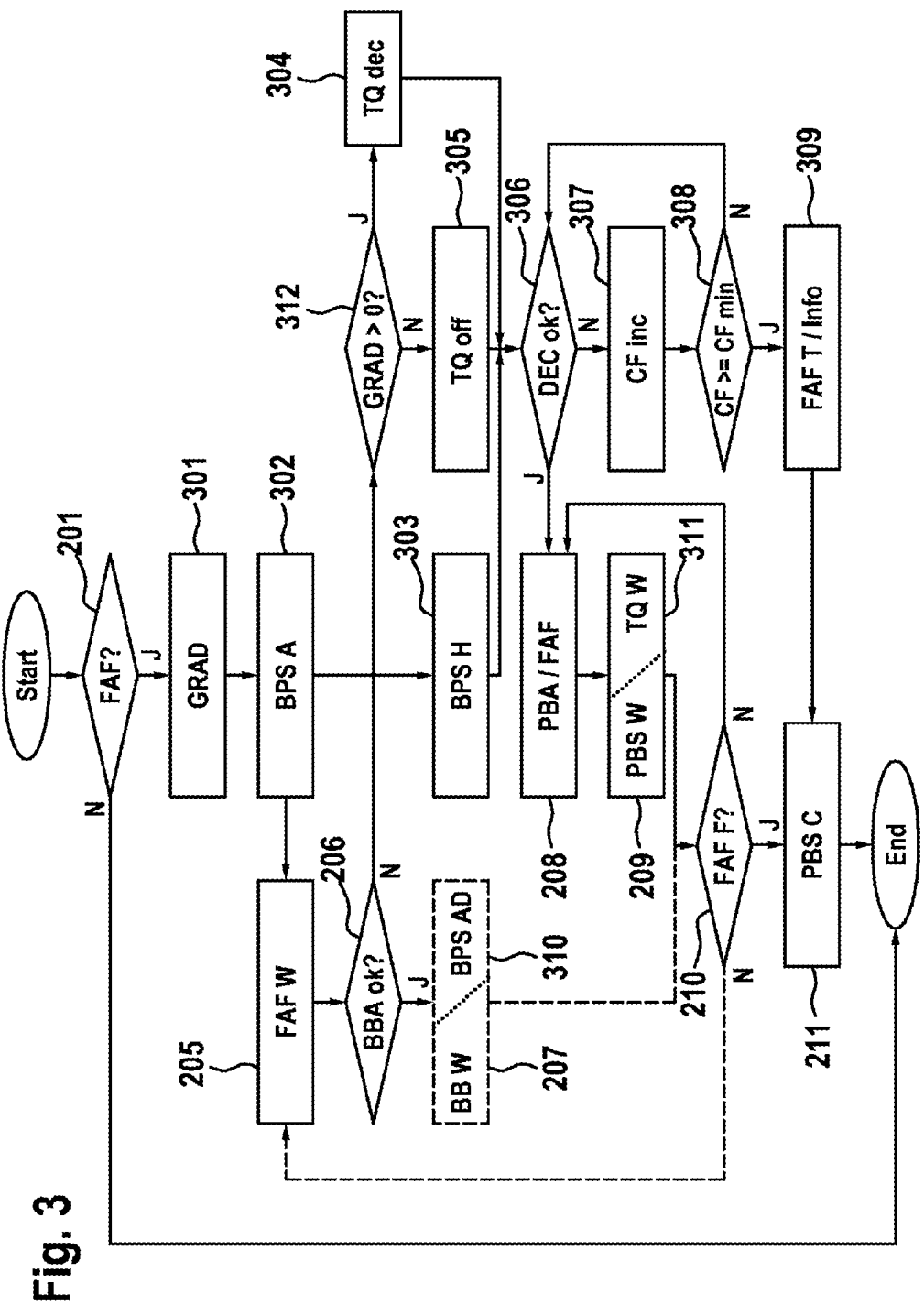
FIG. 3 shows a flow chart for illustrating the significant steps of a method for protecting a driver assistance system in the event of a fault in the service brake system with simultaneous high availability of the system by setting a holding force on an incline.

FIG. 3 shows a flow chart for illustrating the significant steps of a method for protecting a driver assistance system in the event of a fault in the service brake system with simultaneous high availability of the system by setting a holding force on an incline using the example of an autonomous parking maneuver. Basically, reference will be made to the above performances of the driver assistance function for the embodiment in FIG. 2, and then in particular the differences will be discussed. The basic difference is that the driver assistance function is performed on an incline.

In this case the gradient is determined in a step 301. A necessary clamping force that enables unintended movement of the automobile to be prevented is determined from the gradient using the algorithm of the driver assistance system. For this purpose, in a step 302 at least one parking brake unit is activated and by means of the same a holding force for the vehicle is produced. The parking brake unit is held in said position in a further step 303. Subsequently or in parallel thereto, the driver assistance function is performed in the already described step 205. As the parking process is generally rather slow, steps 205 and 302 can be started one after the other, at the same time or even in reverse order. Overall, it is the case that the earlier a torque is provided by the parking brake, the shorter is the distance travelled in the event of a fault.

If it is identified in a step 206 that the service brake system is in order (J), the necessary force modulation for the performance of the driver assistance function is carried out in a step 207 by means of the service brake. It will be understood that the clamping force of the brake that is produced and provided by means of the parking brake, or the holding force of the motor vehicle, is suitably adapted to the gradient in a step 310 in parallel and in coordination therewith.

If it is identified in a step 206 that there is a problem with the service brake system (N), different reactions can be performed depending on the gradient determined in step 301 and the driving direction of the driving maneuver relative to the slope that is to be followed. If for example the driving direction defined in step 312 is "uphill" (J), the engine torque is partly reduced in a step 304 in order to not constitute too large a drive force. If for example the driving direction is "downhill" (N), in contrast the engine torque is completely reduced. Further, a braking torque of the engine can also be used in order to advantageously decelerate a movement of the vehicle.

In a next step 306 it is determined whether the deceleration of the vehicle is sufficient. The parking brake unit that has been held in the clamping position that was determined based on the gradient also contributes to the deceleration of the vehicle. If the deceleration of the vehicle is not sufficient (N), the clamping force of the parking brake unit is increased in a step 307. During this a check is made in a step 308 as to whether the clamping force is already greater than a limit of the minimum clamping force for the parking brake unit. If this is not yet the case (N), a further check is made as to whether the deceleration of the vehicle is sufficient or must be further increased. If the clamping force is greater than the limit of the minimum clamping force (J), in the example the driver assistance function is terminated with a step 309 and related information is generated.

The user can also obtain information in further steps, for example steps illustrated in FIG. 2, for example acoustic, haptic and/or visual information about a malfunction of the service brake system and a takeover by the parking brake even in the case of continuation of the driver assistance function, in order for example to be informed about limited operation.

If the originally achieved deceleration of the vehicle or the deceleration of the vehicle achieved by increasing the clamping force is sufficient (J) in order to prevent unintended movement of the vehicle, the driver assistance function is performed with the parking brake system in a step 208. For this purpose, a necessary force, or a changed force, is implemented by means of the parking brake unit in step 209. At the same time, the motor torque is reset according to the situation in a step 311.

During the performance of the driver assistance function, a check is made in a step 210 as previously described as to whether the driver assistance function has terminated. If this is not the case (N), in the illustrated exemplary embodiment and in the event of a previously identified fault of the service brake system the process is continued with step 208, and in the event of no previously identified fault the process is continued with step 205.

If in step 210 the driver assistance function is assessed as terminated (J), a normal build-up of force is carried out by means of the parking brake unit in a subsequent step 211. In this case said step 211 is to be compared with the activation of the parking brake of the vehicle in the parked state.

This ends the process.

Figure 4:
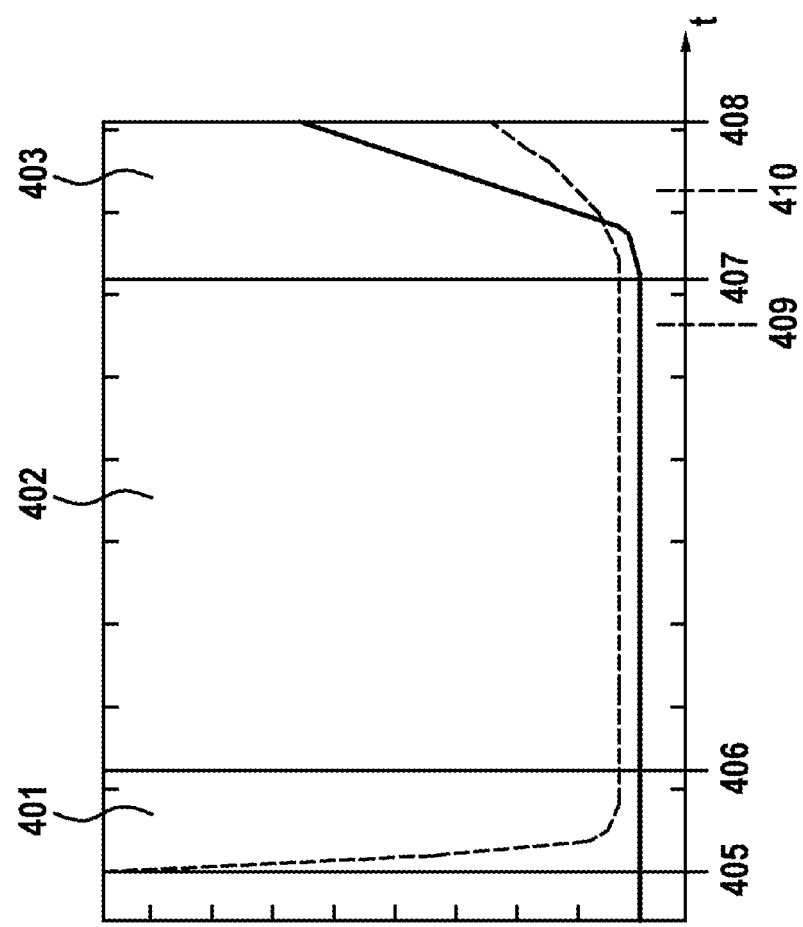
FIG. 4 shows an exemplary current and force profile against time for a parking brake.

FIG. 4 shows an exemplary motor current profile 411 and clamping force profile 412 for a parking brake against time (t). In the region 401 (also known as the "starting phase"), the motor is first energized and the parking brake unit is activated. The two points in time 405 and 406 mark the start point in time and the end point in time of the phase. The X-axis represents a timeline. However, for example deflection positions of the parking brake unit can also be derived from the points in time of the X-axis. The point in time 405 corresponds for example to the rest position of the parking brake. The points in time 409 or 410 can represent a predetermined operative state of the parking brake by way of example. Here it is significant that starting from the predetermined operative states of the parking brake, a new activation results in an increase of the force in a short time or immediately, and hence to a braking process with minimal time delay.

In the region 402 (also known as the "idle phase"), the free travel and the air gap are overcome. Said phase is described by the two points in time 406 and 407. Said process lasts a relatively long time, as can be seen on the time axis, and can extend up to 1 second. In order to enable a very fast response of the parking brake unit and a rapid generation of a holding force when required, the parking brake unit can already be shifted into a predetermined position at the start of the driver assistance function, which corresponds to the point in time 409, and this can lie in the rear region of the phase 402 or even in the front region of the phase 403.

In the region 403 (also known as the "force application phase") a build-up of force takes place, i.e. for example a clamping force is built up between the parking brake unit and a brake disk. The two points in time 407 and 408 mark the starting point and the end point of the phase. During the performance of a driver assistance function on an incline, it is important that the vehicle does not carry out any unwanted movement. Therefore, it must already be suitably braked at the starting point in time of the autonomous driving maneuver. The parking brake unit is shifted into a suitable further predetermined position for this purpose in order to apply the necessary braking force. Said position corresponds to the point in time 410, which lies within the Phase 403.

Figure 5:
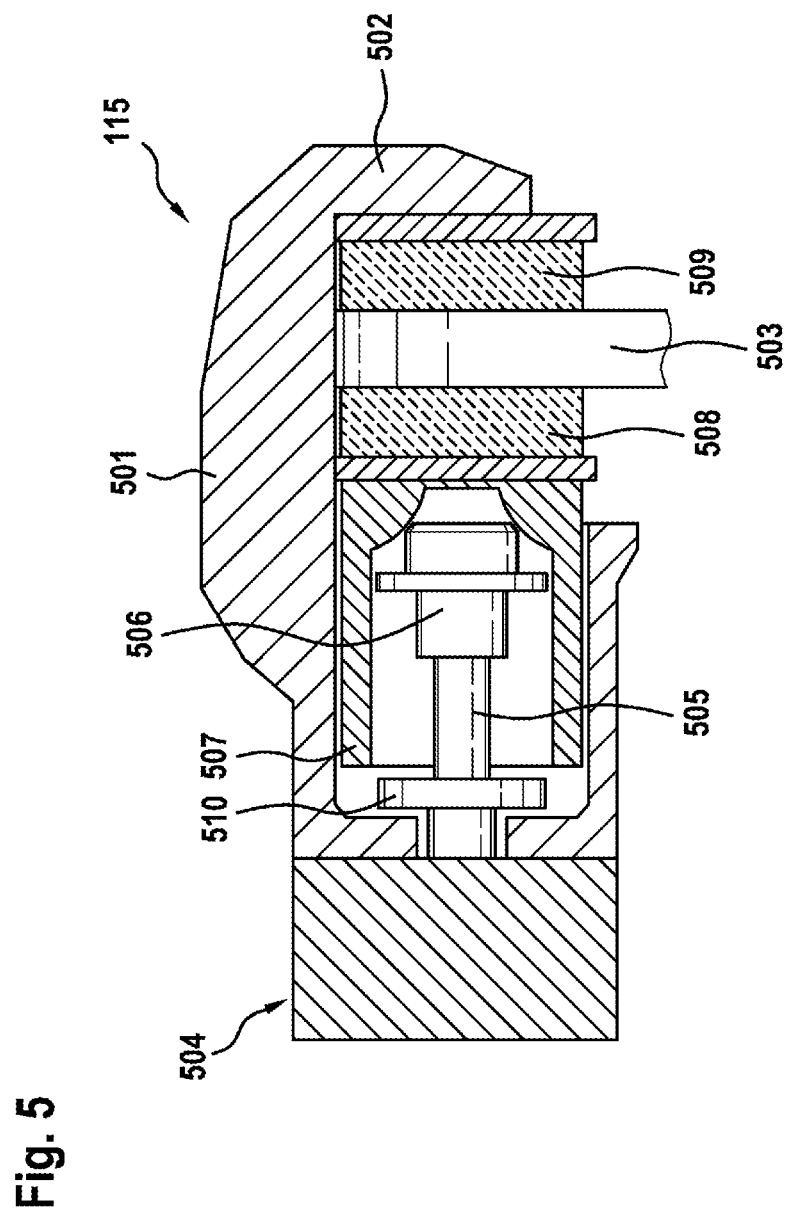
FIG. 5 shows a section through an electromechanical parking brake for a vehicle, in which the clamping force is produced by means of an electric brake motor.

In FIG. 5 an electromechanical parking brake 115 for holding a vehicle at a standstill is illustrated. The parking brake 115 comprises a brake caliper 501 with a jaw 502 that engages over a brake disk 503. The parking brake 115 comprises an electric motor 504 as a brake motor that forms the actuating element that rotationally drives a spindle 505 on which a spindle component 506 that is implemented as a spindle nut is supported, in particular rotationally fixedly. During rotation of the spindle 505, the spindle component 506 is displaced axially. The spindle component 506 moves within a brake piston 507 forming the support for a brake pad 508 that is forced against the brake disk 503 by the brake piston 507. On the opposite side of the brake disk 503 there is a further brake pad 509 that is held positionally fixedly on the jaw 502.

During rotation of the spindle 505, the spindle component 506 can move axially forwards within the brake piston 507 in the direction of the brake disk 503, or axially rearwards during an opposite rotation of the spindle 505 until reaching a stop 510. In order to generate a clamping force, the spindle component 506 acts on the inner end face of the brake piston 507, whereby the brake piston 507, which is axially displaceably supported in the parking brake 115, is forced with the brake pad 508 against the facing end face of the brake disk 503.

The invention claimed is:

1. A method for operating a motor vehicle, the method comprising:
   detecting an operating mode of the motor vehicle;
   shifting an operative state of a parking brake unit of a parking brake of the motor vehicle from a rest state into a predetermined operative state in response to the detected operating mode corresponding to a predetermined operating mode of the motor vehicle;
   detecting a reaction of the motor vehicle to the parking brake being shifted to the predetermined operative state; and
   dynamically adapting the operative state of the parking brake based on the detected reaction of the motor vehicle to the parking brake being in the predetermined operative state,
   wherein the parking brake is configured to, in the predetermined operative state, produce a lower braking effect compared to a full activation of the parking brake,
   wherein the motor vehicle includes a service brake and a parking brake, the service brake being activated by a pressure generator, the parking brake being activated by a parking brake unit, and
   wherein the motor vehicle is configured with at least one of (i) an autonomous operating mode and (ii) a partially autonomous operating mode that can be activated.

2. The method as claimed in claim 1, wherein the predetermined operating mode of the motor vehicle comprises at least one of:
- an autonomous operating mode;
- a partially autonomous operating mode;
- a standstill of the motor vehicle;
- a deceleration of the motor vehicle;
- an inclination of the motor vehicle;
- at least one of (i) at least one fault and (ii) unavailability of the at least one of the autonomous operating mode and partially autonomous operating mode; and
- at least one result of a test, the test being a cyclical test of components and operative states of the vehicle that are necessary for the at least one of the autonomous operating mode and partially autonomous operating mode.

3. The method as claimed in claim 1, further comprising, while in the predetermined operative state of the parking brake, at least one of:
- minimizing at least one of an air gap and a free travel of the parking brake compared to the rest state;
- setting at least one of a predetermined air gap and a free travel of the parking brake; and
- applying a predetermined braking effect with the parking brake such that at least one of:
  - a position of the parking brake is set such that at least one of a partially laden and fully laden motor vehicle is held on an incline; and
  - a position of the parking brake is set such that at least one of a partially laden and fully laden motor vehicle is braked.

4. The method as claimed in claim 1, further comprising:
determining the predetermined operative state of the parking brake based on any existing wear of at least one of the service brake and the parking brake.

5. The method as claimed in claim 1, further comprising, while the parking brake is shifted from the rest state into the predetermined operative state:
setting the predetermined operative state of the parking brake using at least one of:
- a travel characteristic that is determined by controlling the parking brake over a defined travel starting from the rest state in the direction of the predetermined operative state of the parking brake;
- a current characteristic that is determined by actuating the parking brake using an electric motor that is controlled up to at least one of (i) a maximum current level and (ii) a defined increase of a current level of the electric motor; and
- a force characteristic that is determined by controlling the parking brake up to a defined maximum clamping force, which is determined using a force estimator.

6. The method as claimed in claim 1, further comprising, while in the predetermined operative state of the parking brake:
- shifting, in a first step the, parking brake in an application direction into a first position; and
- shifting, in a second step, the parking brake in a release direction into a second position,
- wherein a greater braking effect that is caused by the parking brake occurs in the first position than in the second position.

7. The method as claimed in claim 1, further comprising, while in the predetermined operative state of the parking brake:
actuating the parking brake so that a braking effect is such that at least one of:
- a holding of a motor vehicle on an incline is caused;
- a movement of the motor vehicle is braked; and
- a movement of the motor vehicle opposite to a desired drive direction is prevented.

8. The method as claimed in claim 1, further comprising, while in a further operative state of the parking brake:
in the event of at least one of a malfunction and unavailability of at least one of the service brake and components of a service brake system, operating the parking brake to at least partly takes over a function of the service brake during the at least one of the autonomous operating mode and partially autonomous operating mode in order to at least partly carry out the activated at least one of the autonomous operating mode and partially autonomous operating mode.

9. The method as claimed in claim 8, further comprising, in the event of at least one of a malfunction and unavailability of at least one of the service brake and components of the service brake system, at least one of:
- reducing a drive torque of a vehicle engine in a first step and resetting the drive torque of the vehicle engine in a further step; and
- adapting a drive torque of the vehicle engine depending on a slope direction of a parking maneuver, the adapting being such that the drive torque is partly reduced in a case of the slope direction having a positive gradient (uphill) and the drive torque is completely reduced in a case of the slope direction having a negative gradient (downhill).

10. The method as claimed in claim 1, wherein the at least one of the autonomous operating mode and partially autonomous operating mode of the motor vehicle is configured as an "adaptive cruise control".

11. The method as claimed in claim 1, wherein the at least one of the autonomous operating mode and partially autonomous operating mode of the motor vehicle is configured as a "parking aid".

* * * * *